United States Patent [19]

MacDonald

[11] 4,111,344
[45] Sep. 5, 1978

[54] SPARE TIRE AND WHEEL SECURING DEVICE

[76] Inventor: Archie T. MacDonald, P.O. Box 483, McPherson, Kans. 67460

[21] Appl. No.: 760,036

[22] Filed: Jan. 17, 1977

[51] Int. Cl.² .................................................. B62D 43/10
[52] U.S. Cl. ................... 224/42.24; 105/473; 151/41.7; 267/150; 280/179 R; 403/144
[58] Field of Search ................. 224/42.24, 42.4, 42.23, 224/42.21, 42.2, 42.06, 42.12, 42.13, 29 R, 42.45 R; 280/179 R; 214/451, 452, 453, 454; 267/150; 105/473, 482; 403/229, 220, 223, 144, 119; 248/523, 511, 539, 351, 226.5, 239, 538, 507, 509; 151/41.7, 41.75; 211/23; 292/256.5, 256.75

[56] References Cited

U.S. PATENT DOCUMENTS

| | | | |
|---|---|---|---|
| 1,296,866 | 3/1919 | Skretting | 248/539 |
| 1,689,149 | 10/1928 | McCloud | 224/42.06 X |
| 2,439,973 | 4/1948 | Gunn | 403/144 X |
| 2,590,450 | 3/1952 | Parsons | 151/41.75 X |
| 2,891,490 | 6/1959 | Elsner | 105/482 |
| 3,613,971 | 10/1971 | Betz | 224/42.06 X |
| 3,658,284 | 4/1972 | Haasl | 267/150 X |
| 4,015,761 | 4/1977 | Kokko | 224/42.24 |

Primary Examiner—Trygve M. Blix
Assistant Examiner—Jerold M. Forsberg
Attorney, Agent, or Firm—John H. Widdowson; Edwin H. Crabtree

[57] ABSTRACT

A spare tire and wheel securing device for securing a spare tire and wheel to the floor of a vehicle. The device attached to the floor of the vehicle and extending outwardly at substantially right angles from the floor of the vehicle for ease in inserting the device through an aperture in the center of the wheel and securing the spare tire and wheel to the floor.

5 Claims, 6 Drawing Figures

SPARE TIRE AND WHEEL SECURING DEVICE

BACKGROUND OF THE INVENTION

This invention relates generally to a device for securing a tire and wheel and more particularly, but not by way of limitation, to a spare tire and wheel securing device for securing the spare tire and wheel to the floor of a vehicle.

Heretofore, vehicles and in particular, automobiles, have a spare tire and wheel mounted in the automobile's trunk. The spare tire and wheel are generaly secured to the floor of the trunk by using an elongated bolt having a curved end portion and a threaded end portion. The curved end portion is received in a looped mounting bracket attached to the floor of the trunk. This structure is similar to the structure of the subject invention, except when removing or securing the wheel, the bolt often becomes disengaged from the bracket. Also, the bolt is free to pivot on the bracket and therefore it drops downwardly resting on the floor of the vehicle. When securing the wheel to the floor of the vehicle, it is difficult to reach through the center of the wheel and lift the bolt upwardly through the center of the wheel. Also, the opening through the center of the wheel may not be large enough to reach therethrough. When this happens, the tire must be lifted on its side and the person installing the wheel must reach underneath the tire to raise the bolt and manipulate the threaded end of the bolt through the center of the tire. When this is completed, normally a wheel mounting plate which is often the base of the tire jack, is inserted around the threaded end of the bolt and a nut is threaded on the threaded end of the bolt, thereby securing the spare tire and wheel to the floor of the vehicle.

The above problem is common in mounting the spare tire and wheel in the trunk of today's automobiles, and is compounded by the bolt and mounting bracket being mounted by some automobile manufacturers underneath the front of the trunk of the automobile, which often makes it neseccary for the installer to crawl inside the trunk to manipulate the bolt through the center of the spare tire and wheel. This type of installation is difficult, and often strenous because of the weight of the spare tire and wheel. Also, the hands and clothing of the installer become dirty.

There are prior art wheel carriers, clamps for holding spare tires and wheels, and locking devices for securing spare tires and wheels. None of these prior art devices provide the advantages of the subject invention, nor do they elimiate the above described problems which occur in mounting the spare tire and wheel to the floor of the vehicle.

SUMMARY OF THE INVENTION

The subject invention eliminates the elongated bolt from being removed from the looped mounting brackets so that the bolt will not become disengaged from the looped mounting bracket when the spare tire and wheel is removed from or mounted to the floor.

The spare tire and wheel securing device biases the elongated bolt on the mounting bracket outwardly at substantially right angles from the floor of the vehicle for ease in positioning the bolt through the hollow center of the wheel around the bolt when it is desired to mount the spare tire and wheel to the floor of the vehicle.

The bolt is continuously biased at a right angle from the floor of the vehicle so that, should the spare tire and wheel hit the end of the elongated bolt when installing the spare tire and wheel, the bolt will pivot on the looped mounting bracket until the bolt becomes disengaged from the side of the wheel and tire. The bolt then is biased into its original position at a right angle from the floor so that the end of the bolt can be received through the center of the wheel.

The invention eliminates the need of having to reach through the center of the wheel to lift up and move the end of the bolt through the center of the wheel or having to lift the side of the tire and wheel and manipulate the end of the bolt through the center of the wheel.

The device is rugged in construction, simple in design, and can be quickly installed in the trunks of automobiles or any other vehicle having a spare tire and wheel mounted thereon.

The spare tire and wheel securing device includes a looped mounting bracket having end portions secued to the floor of the vehicle and an outwardly extending looped center portion. An elongated bolt having a curved lower end portion is received through the looped center portion of the bracket. The bolt further includes a threaded upper end portion. The threaded upper end portion is received through the aperture in the center of the wheel for receiving a wheel mounting plate if required and a threaded bolt for securing the spare tire and wheel to the floor. A biasing means engages the looped center portion of the bracket and the curved lower end portion of the bolt securing the bolt to the looped center portion. The biasing means biases the bolt outwardly at substantially a right angle from the floor of the vehicle for ease in receiving the center of the wheel therearound.

The advantages and objects of the invention will become evident from the following detailed description when read in conjunction with the accompanying drawings which illustrate the preferred embodiments of the invention.

DETAILED DESCRIPTION OF THE DRAWINGS

Figures 1, 2:
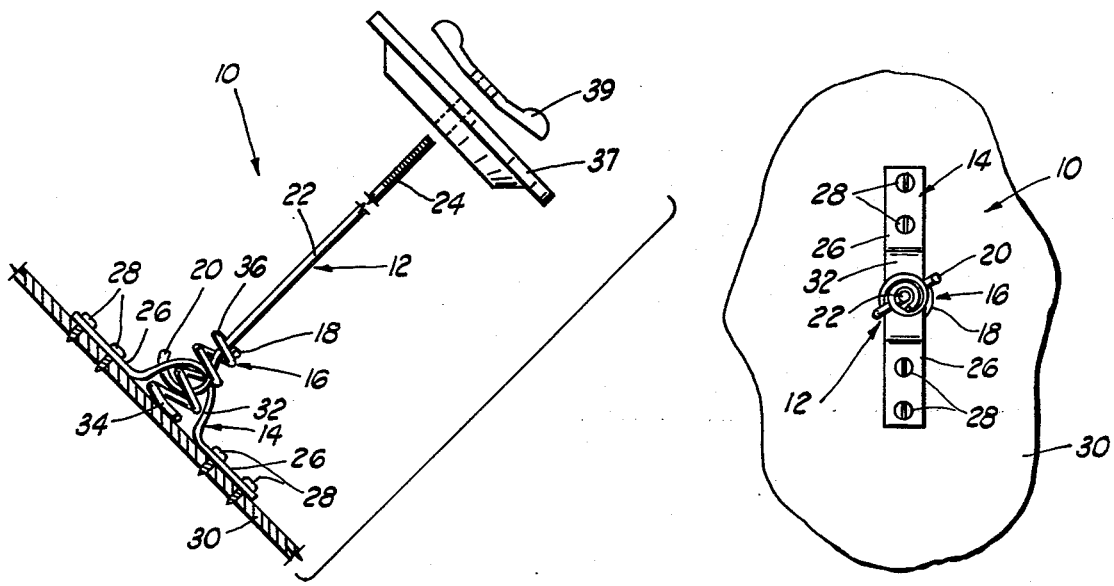
FIG. 1 illustrates a side view of the spare tire and wheel securing device in position for receiving a wheel mounting plate and nut.
FIG. 2 is a top view of the device.

In FIG. 1, the spare tire and wheel securing device is designated by general reference numeral 10. The device 10 includes an elongated bolt 12, a looped mounting bracket 14, and a pivot means 16, which in this case is a helical coil spring 18.

The bolt 12 includes a curved lower end portion 20, an elongated center portion 22, and a threaded upper end portion 24. The looped mounting bracket 14 includes end portions 26 having apertures therein for receiving threaded screws 28 for securing the bracket 14 to a floor 30 of the vehicle. The bracket 14 further includes a looped center portion 32 for receiving the curved lower end portion 20 of the bolt 12 therethrough. The spring 18 is threaded around the lower end portion 20 of the bolt 12 and the looped center portion 32 of the bracket 14. By threading the convolutions of the spring 18 around the looped center portion 32 and lower end portion 20, the lower end portion 20 is pivotally mounted to the top of the looped center portion 32 of the backet 14. A lower end portion 34 of the spring 18 rests against the top of the trunk floor 30, while an upper end portion 36 of the spring 18 is disposed around the top of the curved lower end portion 20 of the bolt 12. The spring 18 biases the bolt 12 outwardly at substantially right angles from the trunk floor 30. The spring 18 is conical in shape with the lower end portion 34 greater in width than the upper end portion 36. The wider lower end portion 34 provides a stable base on the floor 30 while the upper end portion 36 provides an opening just large enough to accomodate the bolt 12 in holding it upright.

Because of the resiliency of the spring 18, the bolt 12 is allowed to pivot from side to side or back and forth on the bracket 14 when the bolt 12 is engaged against the side of the spare tire and wheel when it is mounted on the device 10. When the bolt 12 becomes disengaged from the spare tire and wheel, the spring 18 pivots the bolt 12 back to its original position at right angles to the trunk floor 30. This position is important, since when installing a spare tire and wheel, the spare tire and wheel is lifted above the device 10 with the hollow center of the wheel centered over the threaded upper end portion 24. When the spare tire and wheel are centered over the threaded upper end portion 24, the spare tire and wheel is lowered to the floor 30 with the center portion 22 and threaded upper end portion 24 of the bolt 12 extending outwardly through the center of the wheel. When this has been completed, usually a wheel mounting plate 37 is centered above the threaded upper end portion 24 and lowered against the top of the wheel. When this has been completed, a threaded nut 39 is threaded on the threaded upper end portion 24 of the bolt 12 and tightened until the spare tire and wheel are secured against the trunk floor 30. The spare tire and wheel are not shown in the drawings, but as can be appreciated, they are a standard tire and wheel used on vehicles wherein the wheel of the tire includes a hollow center portion.

In FIG. 2, a top view of the device 10 is illustrated. This view would be typical of the view seen of the device 10 when mounting the spare tire and wheel on the device 10. The threaded upper end portion 24 can be seen extending outwardly toward the viewer with the helical spring 18 disposed around the curved lower end portion 20 of the bolt 12 and around the looped center portion 32 of the bracket 14.

Figures 3, 6:
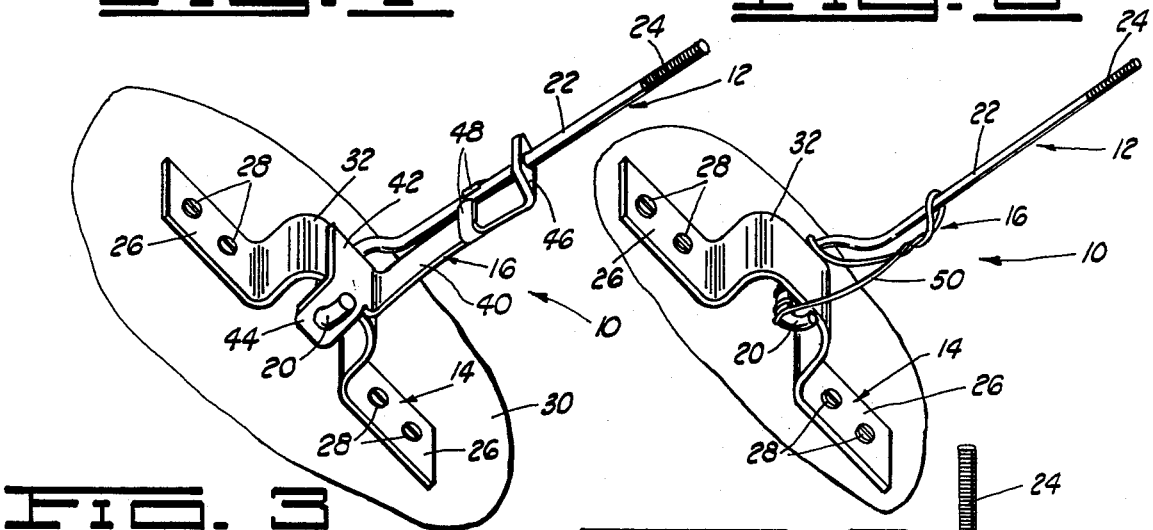
FIG. 3 is a perspective view of the device having an alternate embodiment of the pivot means.
FIG. 6 is an alternate embodiment of the device.

In FIG. 3, the device 10 is seen with an alternate embodiment of the biasing means 16. In this illustration, the biasing means 16 takes the form of a metal resilient strap 40. The strap 40 includes an "L" shaped lower end portion 42 positioned on top of the center portion 32 of the bracket 14. The end portion 42 of the strap 40 includes a downwadly extending flange 44 with an aperture therein. The flange 44 is disposed adjacent the opening of the loop in the center portion 32 of the backet 14. The flange 44 receives the end of the curved lower end portion 20 of the bolt 12 through the aperture and secures the bolt 12 to the top of the center portion 32 of the bracket 14.

The strap 40 also includes an "L" shaped upper end portion 46 having an aperture therein for receiving the center portion 22 of the bolt 12 therethrough. The strap 40 further includes arms 48 which are folded around the bolt 12 for retaining the bolt 12 adjacent the strap 40.

Figure 4:
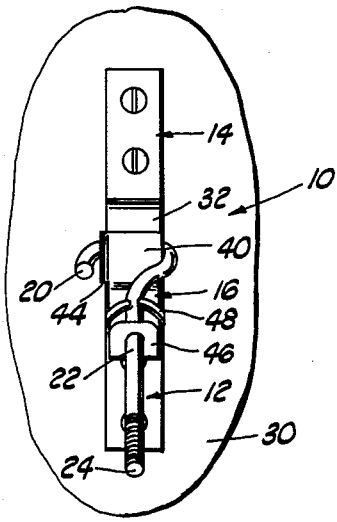
FIG. 4 is a top view of the device shown in FIG. 3.

In FIG. 4, a top view of the device 10 is seen having the metal strap 40 biasing the bolt 12 outwardly toward the viewer. The strap 40 allows the bolt 12 to be pivoted back and forth in a direction parallel to the length of the bracket 14. When the bolt 12 is released, the metal strap biases the bolt 12 back to a position which is substantially at right angles to the floor 30 of the vehicle.

Figure 5:
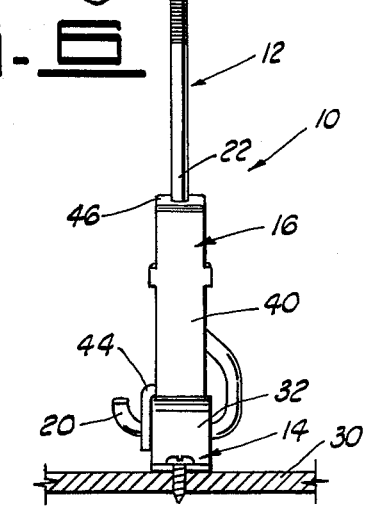
FIG. 5 is a front view of the device shown in FIG. 3.

In FIG. 5, a front view of the device 10 is seen with the metal strap 40 biasing the belt 12 upwardly and at substantially right angles to the floor 30. In this view, a side view of the curved lower end portion 20 of the bolt 12 is seen with the end of the curved end portion 20 inserted through the aperture in the flange 44 of the strap 40.

In FIG. 6, a perspective view of the device 10 is seen similar to the view shown in FIG. 3, but with an alternate embodiment of the biasing means 16. In this illustration, the biasing means 16 is shown as a resilient metal wire 50. The wire 50 acts substantially the same as the helical spring 18 and the metal strap 40. The resilient wire 50 is wrapped around the curved lower end portion 20 of the bolt 12 and the looped center portion 32 thereby securing the bolt 12 to the looped center portion 32 of the bracket 14. Also, the wire 50 is secued around the center portion 22 of the bolt 12. The wire 50 biases the bolt 12 outwardly at right angles to the floor 30 and provides a biasing means wherein the bolt 12 can be moved backward and forward and side to side with the wire 50 returning the bolt 12 to the outwardly extending position at right angles to the floor so that the bolt 12 can be continually maintained in this position and the spare tire and wheel can be centered over the bolt 12 for ease in inserting the bolt 12 through the aperture in the center of the wheel and securing the spare tire and wheel to the floor 30.

Changes may be made in the construction and arrangement of the parts or elements of the embodiment as disclosed herein without departing from the spirit or scope of the invention as defined in the following claims.

I claim:

1. A spare tire and wheel securing device for mounting on the floor of a vehicle, the device extending through an aperture in the center of the wheel and threadably attached to a nut for securing the tire and wheel therebetween, the device comprising:

a looped mounting bracket having end portions secured to the floor of the vechile and an outwardly extending looped center portion;

an elongated bolt having a curved lower end portion, an elongated center portion, and a threaded upper end portion, the curved lower end portion received through the looped center portion of said bracket, the threaded upper end portion receiving the nut; and biasing means for biasing said bolt outwardly from said bracket and holding said bolt at substantially right angles from the floor of the vehicle, said biasing means engaging the looped center portion of said bracket and the curved lower end portion of said bolt and securing aid bolt thereto, whereby when said bolt is moved back and forth or side to side on said bracket when contacted by the wheel it is returned to substantially a right angle from the floor of the vehicle of said biasing means when said bolt is received through the aperture in the center of the wheel.

2. The device as described in claim 1, wherein said biasing means is a coil spring.

3. The device as described in claim 2, wherein said coil spring is threaded around the looped center portion of said bracket and the curved lower end portion of said bolt, the convolutions of said spring securing the curved lower end portion of said bolt against the outwardly extending looped center portion of said bracket, the lower end portion of said coil spring resting against the floor of the vehicle, the upper end of said coil spring disposed around the top of the curved lower end portion of said bolt.

4. The device as described in claim 1 wherein said biasing means is a steel wire, said steel wire wrapped around the curved lower end portion of said bolt and around the center portion of said bolt, said wire securing the curved lower end portion of said bolt to the looped center portion of said bracket.

5. A spare tire and wheel securing device for mounting on the floor of a vehicle, the device extending through an aperture in the center of the wheel and threadably attached to a nut for securing the tire and wheel therebetween the device comprising:

a looped mounting bracket having end portions secured to the floor of the vehicle and an outwardly extending looped center portion;

an elongated bolt having a curved lower end portion, an elongated center portion, and a threaded upper end portion, the curved lower end portion received through the looped center portion of said bracket, the threaded upper end portion receiving the nut; and a metal strap, said metal strap having an "L"-shaped lower end portion, the "L"-shaped lower end portion having a downwardly extending flange witn an aperture therethrough, the aperture receiving the curved lower end portion of said bolt, said metal strap further including an "L"-shaped upper end portion having an aperture therethrough for receiving the center portion of said bolt, said metal strap securing said bolt to the looped center portion of said bracket an allowing said bolt to be pivoted back and forth in a direction parallel to the length of said bracket when contacted by the wheel and said metal strap returning said bolt to a right angle from the floor of the vehicle when said bolt is received through the aperture in the center of the wheel.

* * * * *